Oct. 7, 1930.          C. B. HARBISON          1,777,752
                         TRAILER TRUCK
                      Filed Aug. 25, 1927          2 Sheets-Sheet 1
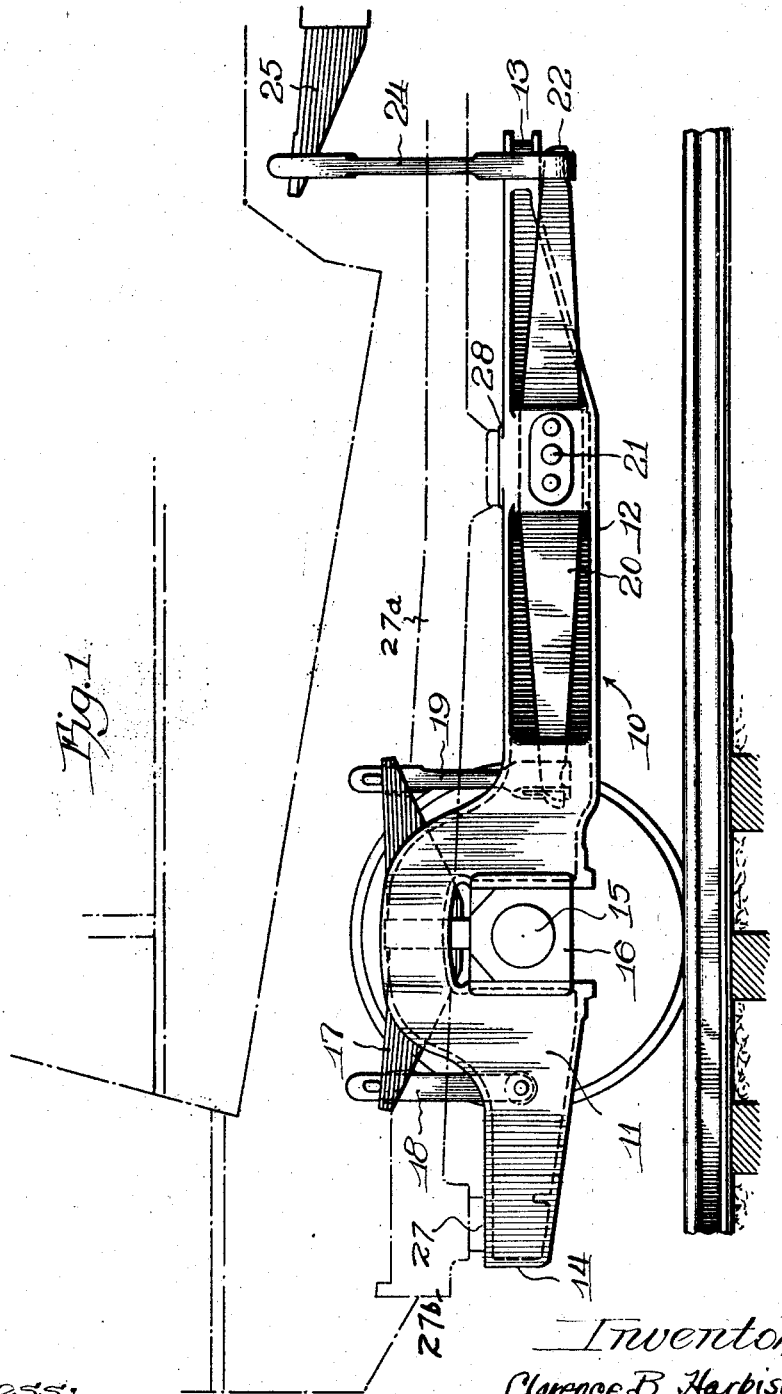

Oct. 7, 1930.  C. B. HARBISON  1,777,752
TRAILER TRUCK
Filed Aug. 25, 1927   2 Sheets-Sheet 2
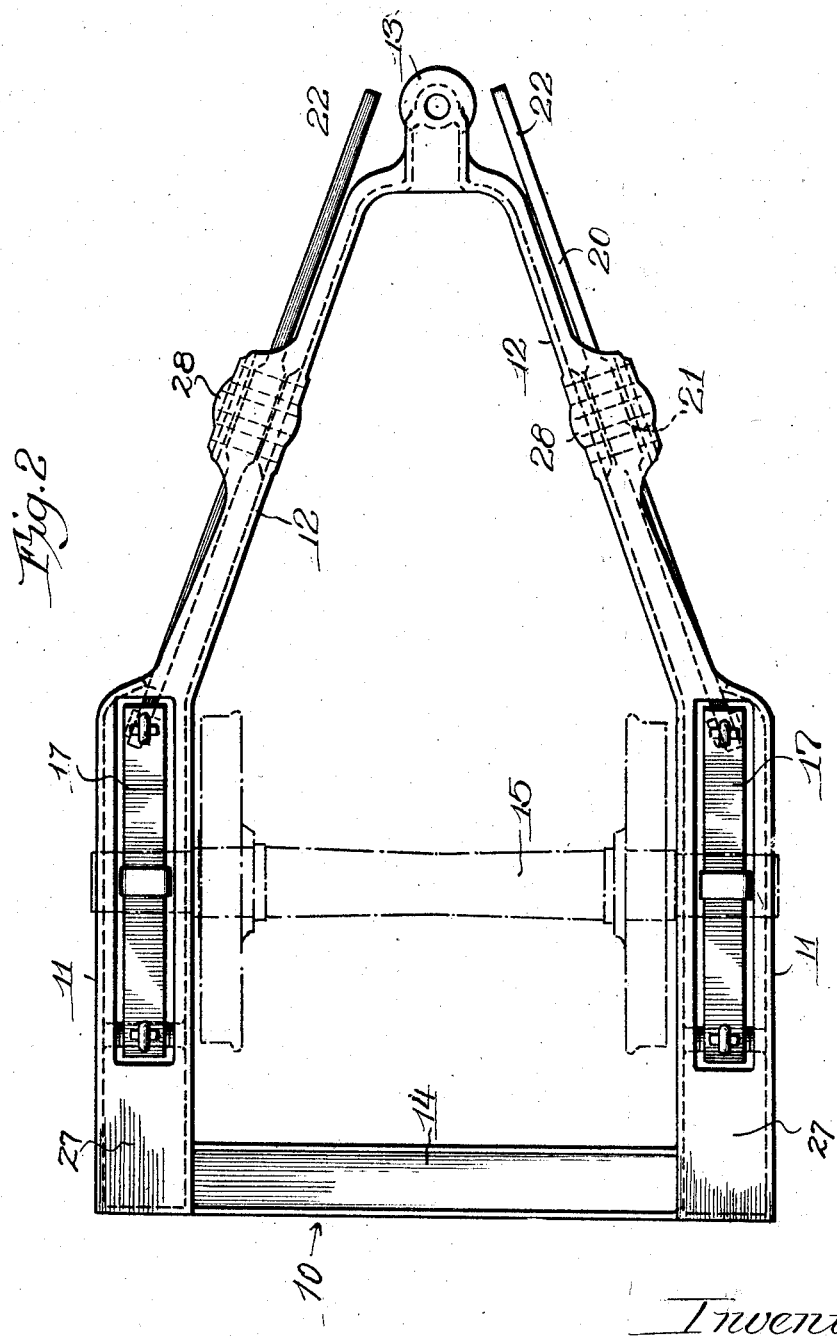

Patented Oct. 7, 1930

1,777,752

UNITED STATES PATENT OFFICE

CLARENCE B. HARBISON, OF LIMA, OHIO, ASSIGNOR TO THE OHIO STEEL FOUNDRY COMPANY, OF LIMA, OHIO, A CORPORATION OF OHIO

TRAILER TRUCK

Application filed August 25, 1927. Serial No. 215,281.

This invention relates to improvements in locomotive trailer trucks, and more particularly to two wheel trailer trucks forming a part of the equalizing system of the locomotive, and has for its principal object to provide a new and improved arrangement and distribution of bearing points for devices of the character described whereby the weight of the locomotive is more evenly distributed, the truck has more stable riding qualities, and can be made lighter than heretofore.

In one well known type of trailer truck now in use, the main engine frame bearings are disposed to the rear of the truck wheels, and the equalizing hangers are connected to the front end of equalizer bars pivoted on the drag braces and extending rearwardly to the front hangers of the truck wheel springs, while in another type, the engine frame bearings are disposed on the forwardly extending drag barces immediately in front of the truck wheels, and the equalizer hangers from the adjacent main driver spring are connected directly to the forward end of said drag braces. It will thus be seen that in either form of trailer truck, the drag braces form a part of the equalizing system, in which the front ends of the braces carry relatively heavy forces applied in an upward direction through the main driver equalizer hangers, either directly on the end of the drag braces or through the auxiliary equalizer bars at their pivot points. Furthermore, the entire truck is more or less unbalanced, and tends to ride unevenly, and considerable upward pressure may be exerted on the front pivotal bearing 13.

In carrying out my invention, I provide means for redistributing the engine weight and equalizing the forces on the drag braces more evenly, as will hereinafter more fully appear in connection with the following description, and illustrated in the accompanying drawings, in which Figure 1 is a side view of a locomotive trailer truck constructed in accordance with my invention.

Figure 2 is a plan view of the truck shown in Figure 1 with parts of the associated spring equalizer rigging shown in full, and the superimposed locomotive parts indicated in dotted lines.

Referring to details shown in the drawings, the truck frame is indicated generally at 10 and includes a pair of side frame members 11, 11 a pair of drag braces 12, 12 continuing forwardly and inwardly from said side frame members and converging at a pivotal bearing support 13, and a rear cross member 14. The truck axle 15 with journals 16, 16 is supported in the usual manner by means of springs 17, 17. The rear end of each of the springs 17, 17 is connected directly to its respective side frame 11 by hanger 18. The front end of each spring has hanger 19 connected to auxiliary equalizer bar 20 extending forwardly along and pivoted at point 21 on its respective drag brace. The forward ends 22, 22 of the two auxiliary equalizer bars project at opposite sides and adjacent the front bearing member 13, in position to be engaged by the hangers 24, 24 of the adjacent main driver springs 25, in the usual manner.

The main frame 27ª of the locomotive indicated in dotted lines extends to the rear of the truck and is provided with draft connections 27ᵇ of the usual form.

It will be seen that the general arrangement of the truck frame elements above described are similar to the first well-known type of trailer described generally at the beginning of this specification. My invention consists mainly in redistributing the weight by re-arranging the bearing points in the following manner: The rear bearing points 27, 27 of the main frame 27ª of the locomotive, heretofore disposed at the rear of the truck axle, are retained but the main bearings for the locomotive frame are provided at 28, 28, well forwardly on the drag braces 12, 12 and preferably adjacent the points of pivotal connection 21, 21 of the equalizer bars 20, 20.

With an improved arrangement as above described, the bending moments of the drag braces are greatly reduced, thus the weight and size of these parts of the frame may be substantially reduced without affecting the strength of the truck. Furthermore, the unbalanced relation of the truck heretofore noted, is eliminated and greater stability is afforded.

Although I have shown and described the particular embodiment of my invention, it will be understood that I do not wish to be limited to the exact construction shown and described, but that various changes and modifications may be made without departing from the spirit and scope of my invention.

I claim as my invention:

In combination with a locomotive frame, including draft gear connections at the rear end thereof, a trailer truck including a spring-mounted supporting axle and wheels and a frame having side members extending forwardly and rearwardly of said axle, said side members having direct pivotal connection with said locomotive frame at the front end of said frame, separate equalizer bars pivotally mounted on each of said forwardly extending frame members and connected between the springs of said truck axle and the equalizer system of the locomotive, and bearing connections for said locomotive frame on said truck disposed both rearwardly of said supporting axle and forwardly of said axle adjacent the point of pivotal connection of said equalizer bars.

Signed at Lima, Ohio, this 13th day of August, 1927.

CLARENCE B. HARBISON.